United States Patent
Tokisato

(10) Patent No.: US 8,033,355 B2
(45) Date of Patent: Oct. 11, 2011

(54) IDLE-ADJUSTING APPARATUS FOR A MOTORCYCLE, AND MOTORCYCLE INCORPORATING SAME

(75) Inventor: Tomoyuki Tokisato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 12/455,892

(22) Filed: Jun. 9, 2009

(65) Prior Publication Data

US 2009/0321172 A1 Dec. 31, 2009

(30) Foreign Application Priority Data

Jun. 30, 2008 (JP) ................................ 2008-171892

(51) Int. Cl.
*B60K 13/02* (2006.01)
*B62K 11/00* (2006.01)
*F02D 41/06* (2006.01)

(52) U.S. Cl. ................... 180/219; 180/335; 123/179.16; 123/179.18

(58) Field of Classification Search ............. 123/179.16, 123/179.18; 180/219, 223, 227, 228, 229, 180/230, 231, 335

See application file for complete search history.

(56) References Cited

U.S. PATENT DOCUMENTS

| 4,385,676 | A | * | 5/1983 | Yoshimura | 180/219 |
|---|---|---|---|---|---|
| 5,595,257 | A | * | 1/1997 | Yoshida et al. | 180/287 |
| 5,762,158 | A | * | 6/1998 | Sumner, Jr. | 180/219 |
| 6,170,590 | B1 | * | 1/2001 | Hisadomi | 180/190 |
| 6,630,007 | B2 | * | 10/2003 | Hirano et al. | 55/385.3 |
| 6,694,937 | B2 | * | 2/2004 | Okuma et al. | 123/179.18 |
| 2008/0302325 | A1 | * | 12/2008 | Reed | 123/179.18 |

FOREIGN PATENT DOCUMENTS

JP 2002-371944 12/2002

* cited by examiner

*Primary Examiner* — Anne Marie Boehler
*Assistant Examiner* — Marc Scharich
(74) *Attorney, Agent, or Firm* — Carrier Blackman & Associates, P.C.; Joseph P. Carrier; William D. Blackman

(57) ABSTRACT

In a motorcycle engine, an air-intake port is opened upwardly, a throttle body is arranged so as to be inclined toward the front, and an idle-adjusting apparatus having an idle-adjusting lever is arranged at a position above a cylinder head and close to a cylinder head cover. The idle-adjusting lever is arranged at a relatively high position where a driver's hand reaches easily, thereby improving operability thereof. A fuel injection apparatus integrally includes the throttle body, an injector, and the idle-adjusting lever. The idle-adjusting lever is ergonomically arranged at a position substantially surrounded by the cylinder head cover, the throttle body and the injector, such that the idle-adjusting lever is arranged in a compact space, by which a compact layout of the engine is achieved.

20 Claims, 11 Drawing Sheets

IDLE-ADJUSTING APPARATUS FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2008-171892, filed on Jun. 30, 2008. The entire subject matter of this priority document, including specification, claims and drawings, is incorporated by reference herein.

BACKGROUND OF THE INVENTION

1. Field of the Invention

The present invention relates to an idle-adjusting apparatus in a motorcycle, and to a motorcycle incorporating the same. More particularly, the present invention relates to an idle-adjusting apparatus having an idle-adjusting lever provided integrally with a fuel injection apparatus of a motorcycle.

2. Description of the Background Art

It is known to provide a choke knob on a carburetor as an idle-adjusting apparatus for improving a performance of an engine during a start-up operation thereof. Also there is a known idle-adjusting apparatus, which improves starting performance by providing a choke knob on the carburetor above a main bore in the crosswise direction and by adjusting the number of idle revolutions by pulling out the choke knob sideways, and thereby increasing the amount of intake air supplied to a combustion chamber of the engine. An example of an idle-adjusting apparatus is disclosed in the Japanese Patent Document JP-A-2002-371944.

A lever for adjusting the idle, such as a choke knob, as described above, is preferably easily operable by an operator who is operatively engaging a seat of the vehicle. However, since a lever (choke knob) is operated by pulling out laterally, if an attempt is made to arrange the lever for adjusting the idle at a user-friendly position, the layout of the engine may be adversely affected, which results in difficulty in providing a compact layout of the engine and the peripherals thereof.

In particular, when providing a choke knob integrally with a fuel injection apparatus having a number of components, the layout of the engine becomes further complicated and difficult.

The present invention has been made to overcome such drawbacks of existing arrangements of an idle-adjusting lever in an engine layout. Accordingly, it is one of the objects of the present invention to provide a compact layout of an engine including a fuel injection apparatus, while securing easy operability thereof.

SUMMARY OF THE INVENTION

In order to achieve the above objects, the present invention according to a first aspect thereof provides an idle-adjusting apparatus in a motorcycle. The motorcycle includes an engine having a cylinder head, a cylinder head cover, and a fuel injection apparatus including a throttle body, an idle-adjusting apparatus including an injector and an idle-adjusting lever. The fuel injection apparatus is operatively connected to an opening end of an air-intake port of the cylinder head. The opening end of the air-intake port is opened upwardly. The idle-adjusting lever is adapted to increase the number of idle revolutions when pulled out, by increasing an amount of intake air supplied to the engine. The present invention according the first aspect is characterized in that, when viewed in a side view, the idle-adjusting lever is arranged at a position located above the cylinder head, and is substantially surrounded by the cylinder head cover, the throttle body and the injector.

The present invention according to a second aspect thereof, in addition to the first aspect, is characterized in that when viewed in a side view, the idle-adjusting lever is arranged at a position vertically overlapped with a fuel injection path of the engine. The fuel injection path is adapted to provide communication of an injection port of the injector with an intake air path of the throttle body.

The present invention according to a third aspect thereof, in addition to the first and second aspects, is characterized in that, when viewed in a side view, a connecting surface formed between the cylinder head cover and the cylinder head is declined towards a front of the motorcycle.

The present invention according to a fourth aspect thereof, in addition to one of the first, second and third aspects, is characterized in that the opening end of the air-intake port is opened so as to be inclined in a direction facing away from an exhaust port protruding from the engine, and the idle-adjusting lever is arranged on a first side of the motorcycle opposite to a second side of the motorcycle having an exhaust pipe.

ADVANTAGES OF THE INVENTION

According to the first aspect of the present invention, since the air-intake port is opened upwardly, and the throttle body is arranged in a position inclined forwardly, the idle-adjusting lever is easily arranged at a convenient position above the cylinder head near the cylinder head cover. Accordingly, since the idle-adjusting lever is arranged at a desired high position where a driver's hand reaches easily, ergonomic operability of the idle-adjusting lever is improved.

Further, since the fuel injection apparatus integrally includes the throttle body, the injector, and the idle-adjusting lever, and the idle-adjusting lever is arranged at the position substantially surrounded by the cylinder head cover, the throttle body, and the injector, the idle-adjusting lever is arranged in a compact space, so that the layout of the engine is reduced in size to provide a compactly-designed engine.

According to the second aspect of the present invention, since the idle-adjusting lever is arranged at the position overlapped with the fuel injection path, compactly downsizing of the fuel injection apparatus is achieved in the direction of the intake-air path.

According to the third aspect of the present invention, since a height the wall (including its surface) of the cylinder head on the side of the air-intake port is increased (heightened), the opening end of the air-intake port is formed so as to be oriented further upwardly. Therefore, since a fuel injection valve (injector) can be mounted with a higher inclination, the idle-adjusting lever can be arranged at a position nearer to the cylinder head to achieve a compact layout of the engine.

According to the fourth aspect of the present invention, since the idle-adjusting lever is arranged on the opposite side from the exhaust pipe at a position close to a side surface of the cylinder head cover, the operability of the idle-adjusting lever is further improved.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
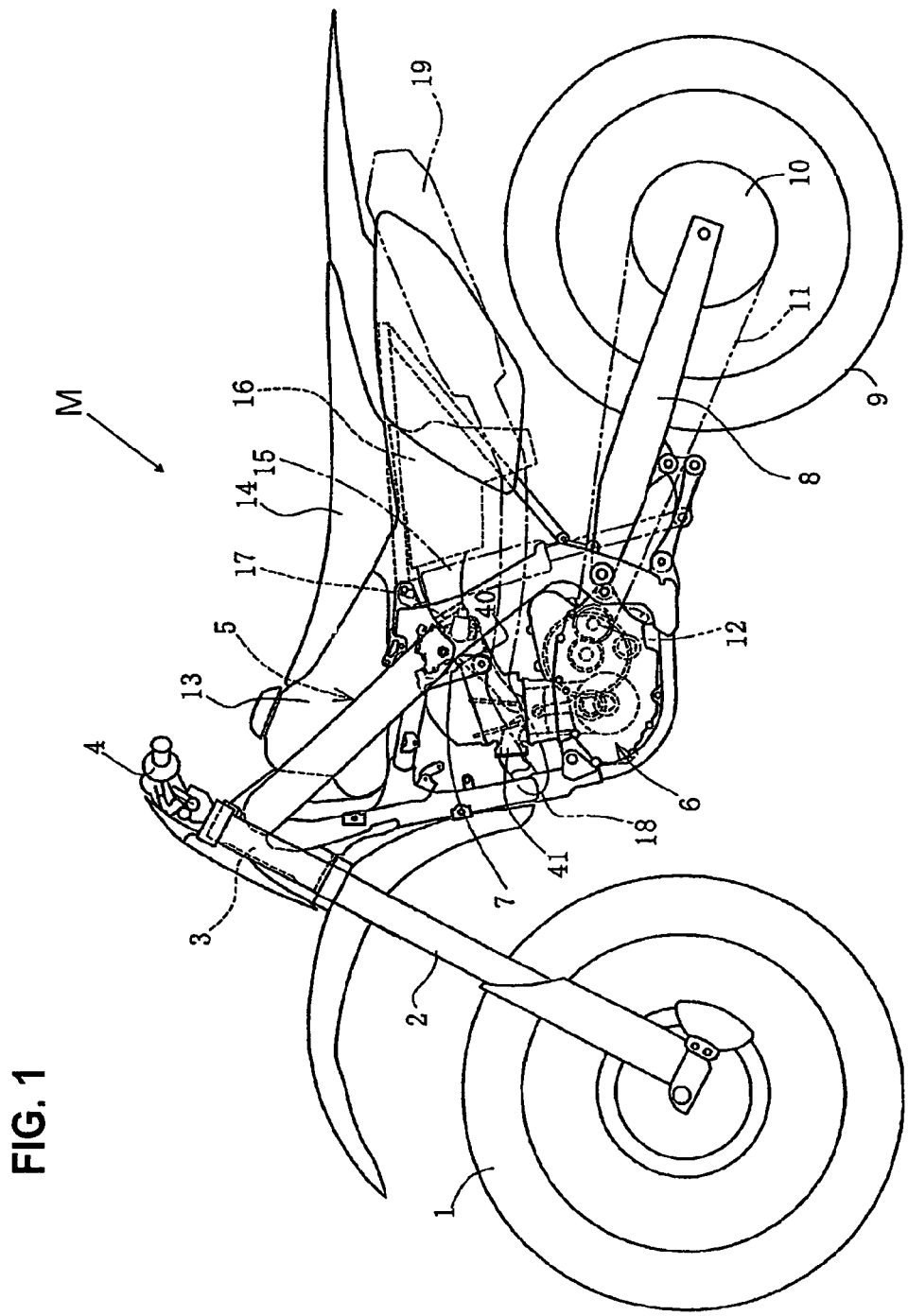
FIG. 1 is a side view of a motorcycle according to an illustrative embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Referring now to the drawings, an illustrative embodiment of the present invention is described below.

FIG. 1 is a side view of an off-road type motorcycle M according to the illustrative embodiment of the present invention. The motorcycle M includes a front wheel 1, a pair of left and right front forks 2 which support the front wheel 1 at the lower ends thereof, a head pipe 3, and a handle 4. An engine 6, having upright cylinders, is supported by a cradle-type vehicle body frame 5 via engine hangers 7. The vehicle body frame 5 includes the head pipe 3 at a front end thereof.

A front end of a rear swing arm 8 is pivotally supported at a rear portion of the vehicle body frame 5. A rear wheel 9 is supported at the rear end of the rear swing arm 8. A driven sprocket 10 is arranged coaxially with the rear wheel 9, and is driven by a drive sprocket 12 of the engine 6 via a chain 11.

The motorcycle M further includes a fuel tank 13, a seat 14, a rear shock absorber 15, and an air cleaner 16. The air-intake downstream side of the air cleaner 16 is operatively connected to a throttle body 17 of an electronic fuel injection apparatus for delivering clean air to the throttle body 17. The throttle body 17 supplies clean air to an air-intake port 40 of the engine 6, and the throttle body also receives and transports atomized fuel from an injector 27 attached to the throttle body 17, where such fuel is mixed with the incoming air.

An exhaust pipe 18 is connected at one end thereof to an exhaust port 41, which is bent in front of the engine 6 and extended rearwardly, and is connected to a muffler 19 arranged at a position located above the rear wheel 9.

Figure 2:
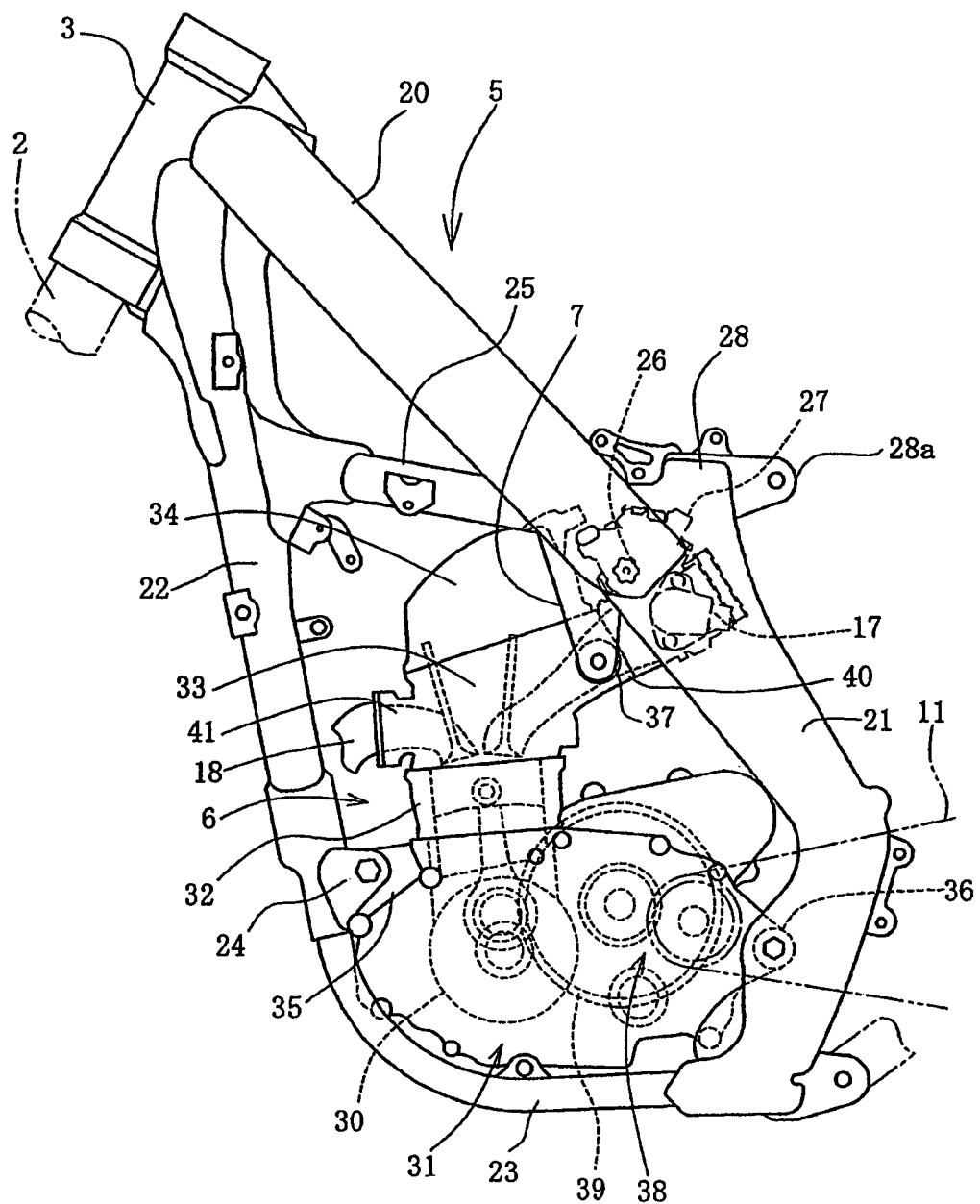
FIG. 2 is a side view of a vehicle body frame supporting an engine of the motorcycle.

FIG. 2 is a side view of the vehicle body frame 5 having the engine 6 mounted thereon. The vehicle body frame 5 includes the head pipe 3; a main frame section 20 extending rearwardly from the head pipe 3 at a declined slope; a pivot frame 21 connected at an upper portion thereof to a rear portion of the main frame section 20 and extending rearwardly of the engine 6 and obliquely downwardly from the main frame. The vehicle body frame 5 also includes a down pipe 22 extending downwardly toward the rear from the head pipe 3 at a steeper angle than the main frame section 20 in front of the engine 6; and a lower frame pipe 23 continuing from a lower portion of the down pipe 22 and extending rearwardly so as to pass below the engine 6. The lower frame pipe 23 is connected to a lower portion of the pivot frame 21 at the rear end thereof. The single-cylinder engine 6 is mounted on the vehicle body frame 5.

The engine 6 includes a crankcase 31 having a crankshaft 30 disposed therein, a cylinder block 32 connected to a front upper portion of the crankcase 31 and extending upwardly, a cylinder head 33 connected to an upper portion of the cylinder block 32, and a cylinder head cover 34 connected to an upper portion of the cylinder head 33.

The engine 6 is supported on the vehicle body frame 5 via a plurality of supporting portions.

The engine 6 is supported on the vehicle body frame 5 via a first supporting portion 35 provided at a front portion of the crankcase 31. The first supporting portion 35 of the crankcase 31 is fastened to a bracket 24 provided at a joint portion between the down pipe 22 and the lower frame pipe 23. A second supporting portion 36 provided at a rear portion of the crankcase 31 is fastened to the pivot frame 21. In addition, a third supporting portion 37 provided at the cylinder head 33 is supported by the main frame section 20 via the engine hangers 7.

The engine hanger 7 at the upper end thereof is mounted, by using a bolt, on a boss provided in the vicinity of a portion of the main frame section 20 where a reinforcing pipe 25 is connected thereto. The reinforcing pipe 25 extends from an upper portion of the down pipe 22 obliquely downwardly, and is connected to the main frame section 20.

The engine hanger 7 extends lengthwise and thinly (i.e., having gradually reduced dimension towards a lower portion thereof) downwardly to the engine in proximity to the main frame section 20. The lower end of the engine hanger 7 is fixed, by using a bolt, to the third supporting portion 37 provided on the side surface of the cylinder head 33 of the engine 6. When viewed in a side view, the engine hanger 7 is overlapped with the air-intake port 40, as seen in FIG. 2.

An idle-adjusting apparatus 100 including an idle-adjusting lever 26, for adjusting the idle state by manually adjusting the air-fuel ratio at the start-up of the engine, is arranged inside the engine hanger 7 or a selected vehicle body frame component (main frame section 20 or pivot frame 21) so as to be overlapped therewith when viewed in a side view. In the illustrative embodiment shown in FIG. 2, the idle-adjusting lever 26 is positioned inside the rear end portion (lower end portion) of the main frame section 20, and inside a portion near the connecting portion with respect to the pivot frame 21 so as to be overlapped with each other.

The idle-adjusting lever 26 is an operational member for adjusting the number of idle revolutions by pulling out the idle-adjusting lever 26 laterally, relative to a longitudinal axis of the motorcycle, and thereby increasing the amount of air to be supplied to the air-intake port 40.

According to such an ergonomic arrangement of the idle-adjusting lever 26 on the engine, i.e., since the idle-adjusting lever is arranged at a high position where a hand of an operator (not shown) of the vehicle reaches easily when the operator occupies the seat 14, an improved operability of the idle-adjusting lever is achieved.

The throttle body 17 is positioned inside the rear portion of the main frame section 20 and the upper portion of the pivot frame 21 so as to be overlapped therewith, when viewed in a side view such as that shown in FIG. 2.

A shoulder portion 28 is provided projecting upwardly from the upper end of the pivot frame 21 and the rear end of the main frame section 20, and a rearwardly-projecting part of the shoulder portion 28 forms a support bracket 28a for supporting an upper portion of the rear shock absorber 15.

Figure 3:
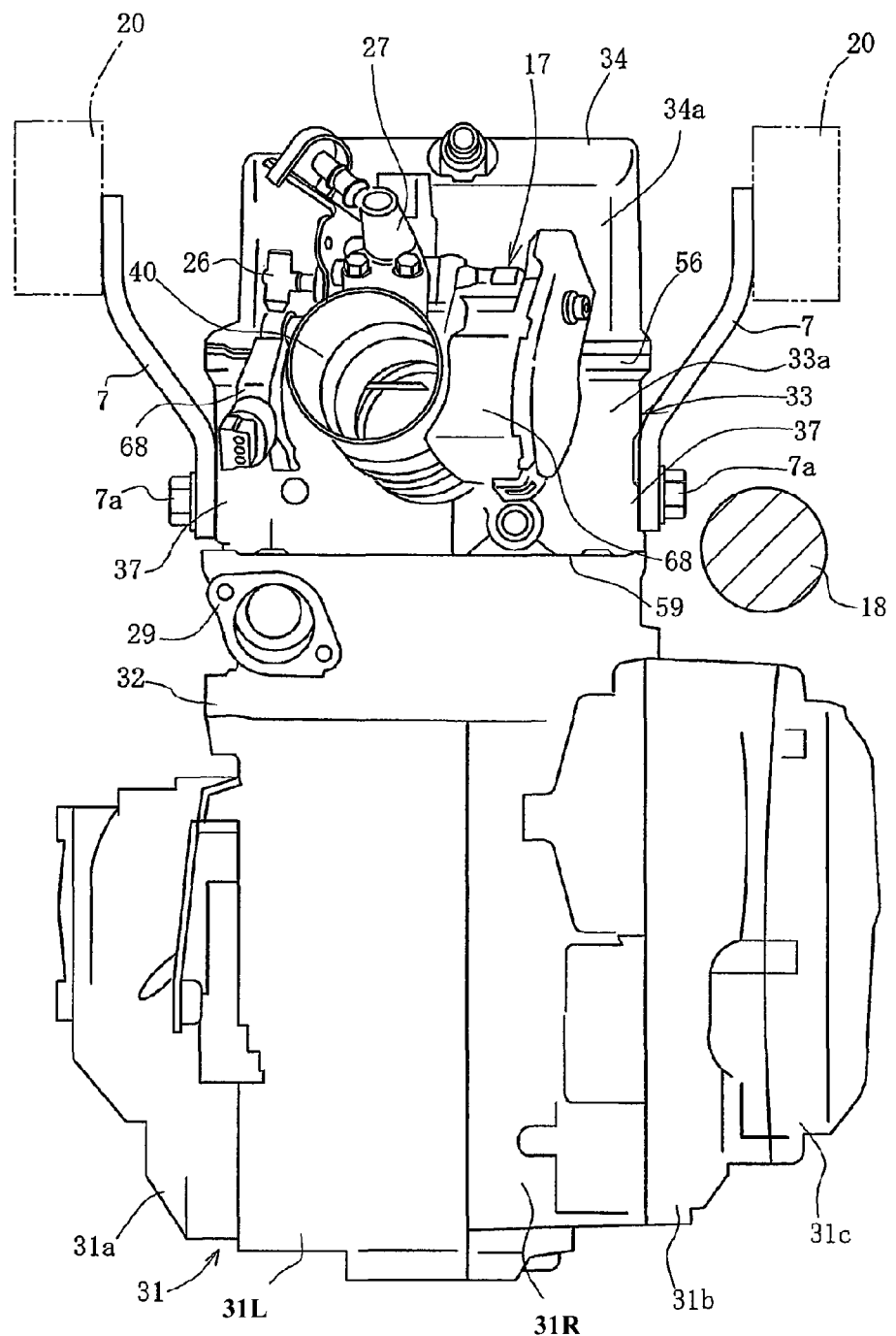
FIG. 3 is a rear view of the engine.

FIG. 3 is a rear view of the engine 6, i.e., a view of the engine when viewed from a vantage point at the rear of the motorcycle. The crankcase 31, the cylinder block 32, the cylinder head 33 and the cylinder head cover 34, which constitute component parts of the engine 6, are stacked in a substantially vertical direction and are integrated with each other. The crankcase 31 is divided into left and right halves, i.e., a left case 31L and a right case 31R. A lateral side of the left case 31L is covered with a left side cover 31a. The right case 31R is covered with a right case cover 31b. In addition, a right side cover 31c is mounted on a right side surface of the right case 31R.

The exhaust pipe 18 is positioned in a space formed above the right case cover 31b and the right side cover 31c, and on the right side of the cylinder block 32 with respect to the vehicle body. The exhaust pipe 18 is positioned at a portion overlapped with a plane of connection extending between the cylinder head 33 and the cylinder block 32 in the left and right direction, and overlapped with the right sides of the cylinder block 32 and the cylinder head 33 with respect to the vehicle in the left and right direction.

The lower end portion of the right engine hanger 7 is mounted, using a bolt 7a, on the third supporting portion 37 between the lower portion of the cylinder head 33 and the exhaust pipe 18. The right engine hanger 7 extends upwardly while broadening obliquely outwardly above the exhaust pipe 18, and is also mounted on the main frame section 20 at a position located above the exhaust pipe 18.

The left engine hanger 7, on the left side of the vehicle body, is also provided in a symmetrical manner to that of the right engine hanger 7, provided on the right side of the vehicle body. A mounting seat 29 of a cam chain tensioner lifter (not shown) is provided on the left end portion of the back surface of the cylinder block 32 which is near a mounting portion of the third supporting portion 37 on which the lower end portion of the left side engine hanger 7 is mounted.

The air-intake port 40 opens so as to project rearwardly and obliquely leftwardly and upwardly, at a central portion of a rear wall 33a of the cylinder head 33 which is located at a position above the mounting portion of the engine hanger 7 with respect to the third supporting portion 37.

The throttle body 17 is arranged so as to substantially coaxially correspond to a circumference of the air-intake port 40, and is attached thereto via an insulator extending therebetween. The injector 27, as a fuel injection valve, is arranged at a position located above the air-intake passage 60 of the throttle body 17. The idle-adjusting lever 26 projects from the upper portion of the throttle body 17 leftwardly with respect to the vehicle body at a position located above the air-intake port 40, which is disposed at a position near the injector 27. These members (a throttle body 17, injector 27 and idle-adjusting lever 26) constitute the fuel injection apparatus, that is, the fuel injection apparatus integrally includes the throttle body 17, the injector 27, and the idle-adjusting lever 26 of the idle-adjusting apparatus 100.

As seen in FIG. 3, the idle-adjusting lever 26, which is overlapped with a rear wall 34a of the cylinder head cover 34 when viewed from a rear side of the engine 6, is positioned within the lateral width of the cylinder head 33 and the cylinder head cover 34, and is positioned inside the main frame section 20 and the engine hanger 7.

The engine hanger 7 assumes a state of protruding to an outermost position on the side of the idle-adjusting lever 26, and a sufficiently large space is defined with respect to the idle-adjusting lever 26, so that the operability of the idle-adjusting lever 26 is secured. In addition, the operation is further facilitated by the idle-adjusting lever 26 being arranged in the vicinity of the side surface of the cylinder head cover 34, which is an opposite side from the exhaust pipe 18.

Figure 4:
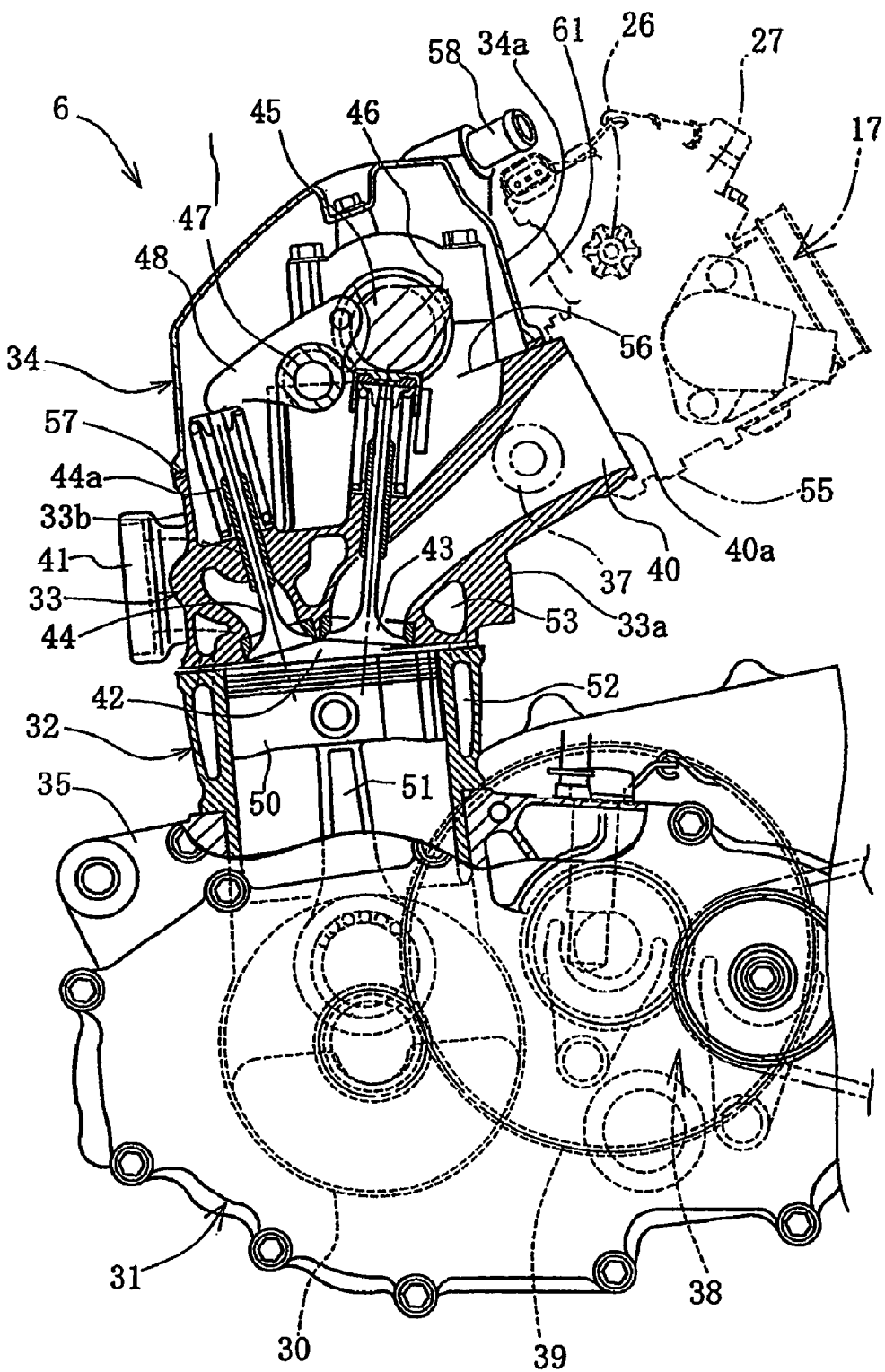
FIG. 4 is a side cross-sectional view of the engine.

FIG. 4 is a side cross-sectional view of the engine 6. The crankshaft 30 includes an axial line extending in the direction of the width (lateral direction) of the motorcycle, and is rotatably supported by the crankcase 31. A constant-mesh transmission 38 is built in the interior rear portion of the crankcase 31. A clutch 39 is provided in the system.

The cylinder head 33 is provided with the air-intake port 40 thereof projecting rearwardly, and the exhaust port 41 projecting forwardly. The air-intake port 40 and the exhaust port 41 communicate with a combustion chamber 42 formed between the cylinder block 32 and the cylinder head 33.

A pair of air-intake valves 43 which are operable to open and close the connection between the combustion chamber 42 and the air-intake port 40, and a pair of exhaust valves 44 which are operable to open and close the connection between the combustion chamber 42 and the exhaust port 41 are disposed in the cylinder head 33. The air-intake valves 43 are each operated (i.e., driven to open and close) by a valve cam 46 arranged on a camshaft 45 having an axial line parallel to the crankshaft 30.

The exhaust valves 44 are each operated (i.e., driven to open and close) by a rocker arm 48 pivotably supported by a rocker shaft 47 having an axial line parallel to the camshaft 45. The rocker arm 48 is arranged between the valve cam 46 and both the exhaust valves 44. The rocker arm 48 is pivoted by the valve cam 46 coming into abutment with one end thereof, and has a bifurcated shape at the other end thereof which comes into abutment with stem ends of the respective exhaust valves 44 to drive the respective exhaust valves 44.

A piston 50 slides in a cylinder bore of the cylinder block 32. The piston 50 is connected to the crankshaft 30 via a connecting rod 51. A first water jacket 52 of the cylinder block 32, and a second water jacket 53 of the cylinder head 33 communicate with each other in a substantially vertical direction. The air-intake port 40 is connected to the throttle body 17 via an insulator 55.

The upper surface of the cylinder head cover 34 is declined towards the front. In other words, the top surface of the cylinder head cover arranged such that a rear side thereof is located at a higher position than a front side thereof. Accordingly, the vertical width of the rear wall 34a is wide. A breather pipe 58 projects rearwardly from a highest position at the upper end of the cylinder head cover 34.

Figure 5:
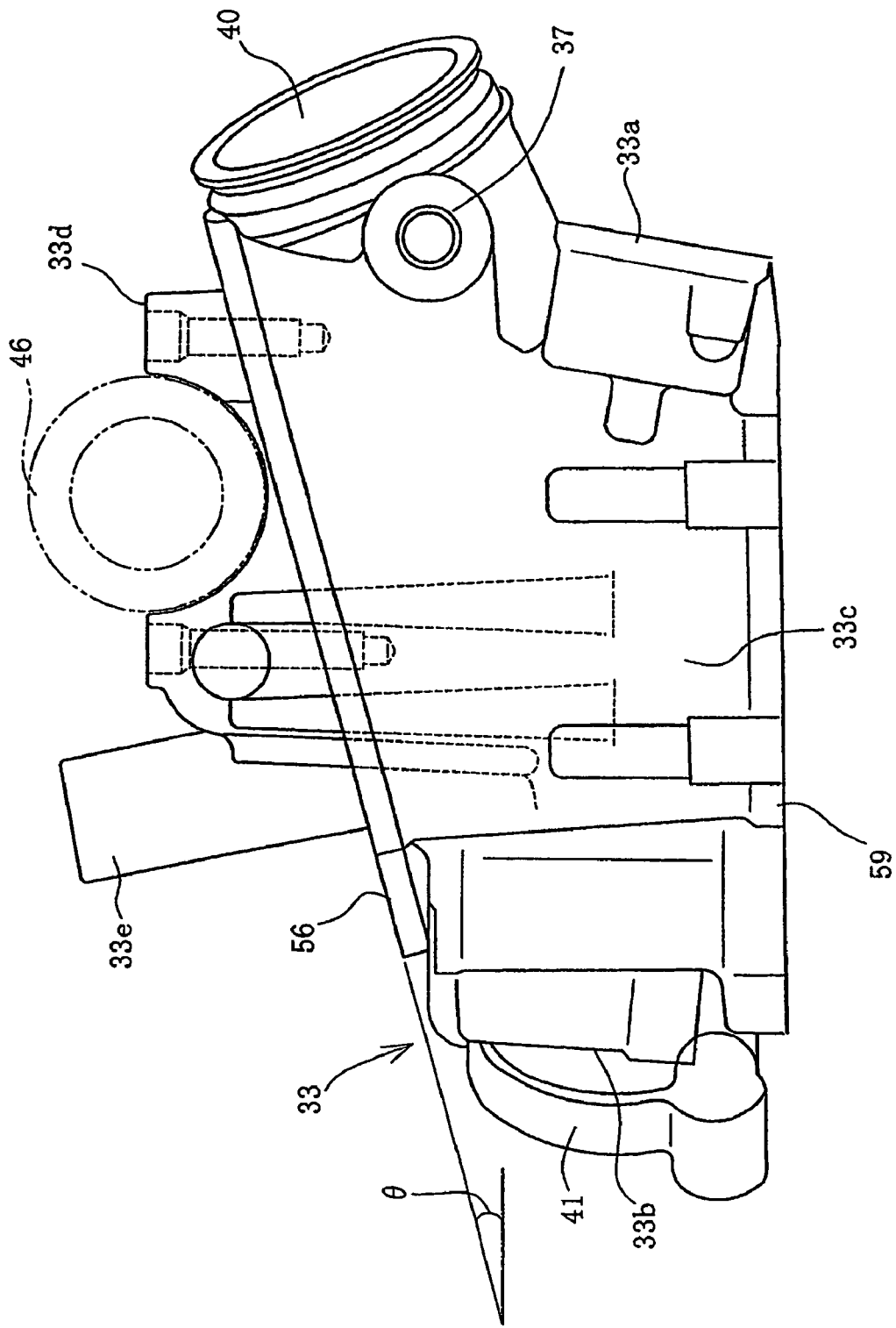
FIG. 5 is a side view of a cylinder head of the engine.
Figure 8:
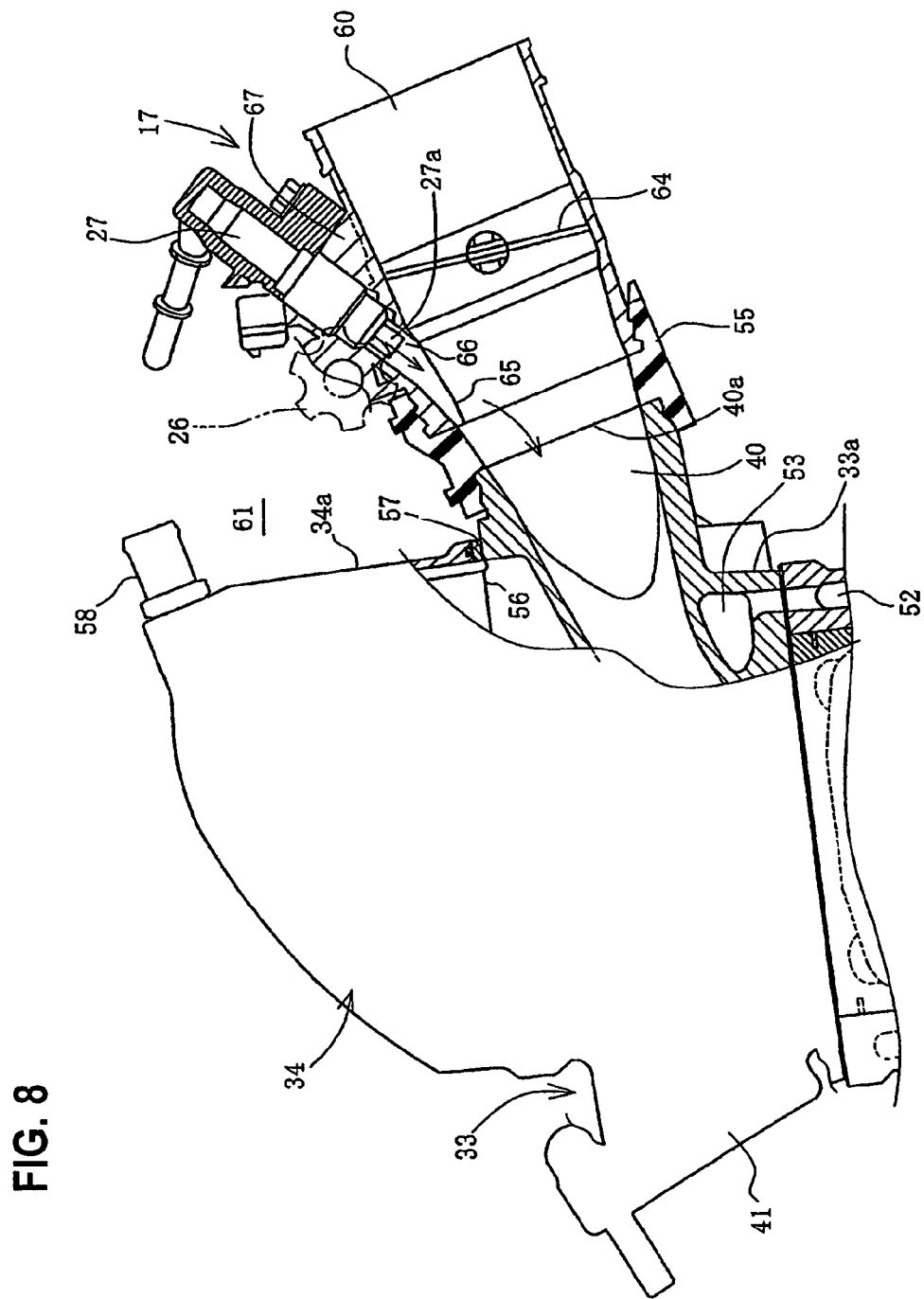
FIG. 8 is a view of the throttle body shown in FIG. 7 along a cross-section in a fore-and-aft direction.

FIG. 5 is a side view of the cylinder head 33. Front and rear portions of the peripheral wall of the cylinder head 33 constitute the rear wall 33a and a front wall 33b. The rear wall 33a is provided with the single air-intake port 40 projecting rearwardly and obliquely upwardly. The front wall 33b is provided with the single exhaust port 41 projecting forwardly. The upper end surfaces of left and right side walls 33c of the peripheral wall of the cylinder head 33 include a joint surface 56 with respect to the cylinder head cover 34, and is joined to the cylinder head cover 34 via a gasket 57 (FIG. 8).

When viewed in a side view, the joint surface 56 is obliquely declined towards the front portion of the vehicle at an angle of inclination θ with respect to a horizontal line, as shown in FIG. 5. A lower surface 59 of the cylinder head 33, which corresponds to the mating surface with the cylinder block 32, extends substantially horizontally. Therefore, the joint surface 56 is inclined so as to be away from the lower surface 59 as the cylinder block 32 is extended towards the rear.

Accordingly, as shown in FIG. 5, the rear wall 33a is increased to widen a vertical width thereof to secure the space for arranging the air-intake port 40, which is oriented obliquely upwardly. A cam holder 33d operatively supports a camshaft 45. The cylinder head 33 includes a plug hole 33e formed therein. The cam holder 33d and the plug hole 33e are protruded respectively upwardly with respect to the joint surface 56.

Figure 6:
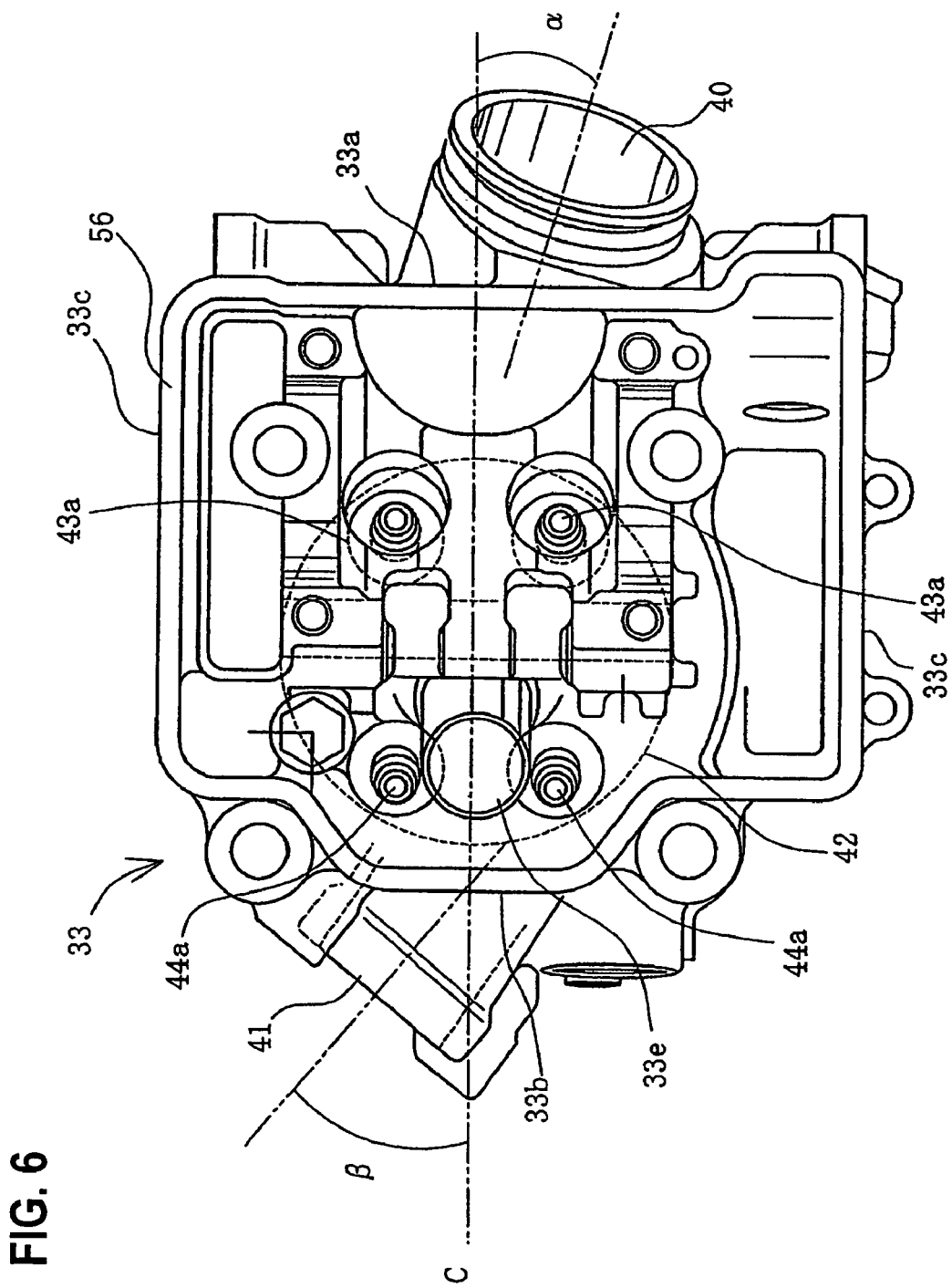
FIG. 6 is a plan view of the cylinder head.

FIG. 6 is a plan view of the cylinder head 33. The air-intake port 40 protrudes obliquely leftwardly and rearwardly from the rear wall 33a, at an angle of inclination of a with respect to a vehicle body centerline C. In contrast, the exhaust port 41 protrudes from the front wall 33b rightwardly with respect to the vehicle body, and projects in a direction substantially opposite to the air-intake port 40 at an angle of inclination β with respect to the vehicle body centerline C.

The upper edge of the peripheral wall of the cylinder head 33 assumes a substantially rectangular shape, and forms a joint plane with respect to the cylinder head cover 34. Stem pipes 43a for allowing passage of stems of the air-intake valves 43, and stem pipes 44a for allowing passage of the exhaust valves 44, are respectively formed obliquely towards the combustion chamber 42 in a vertical direction.

Figure 7:
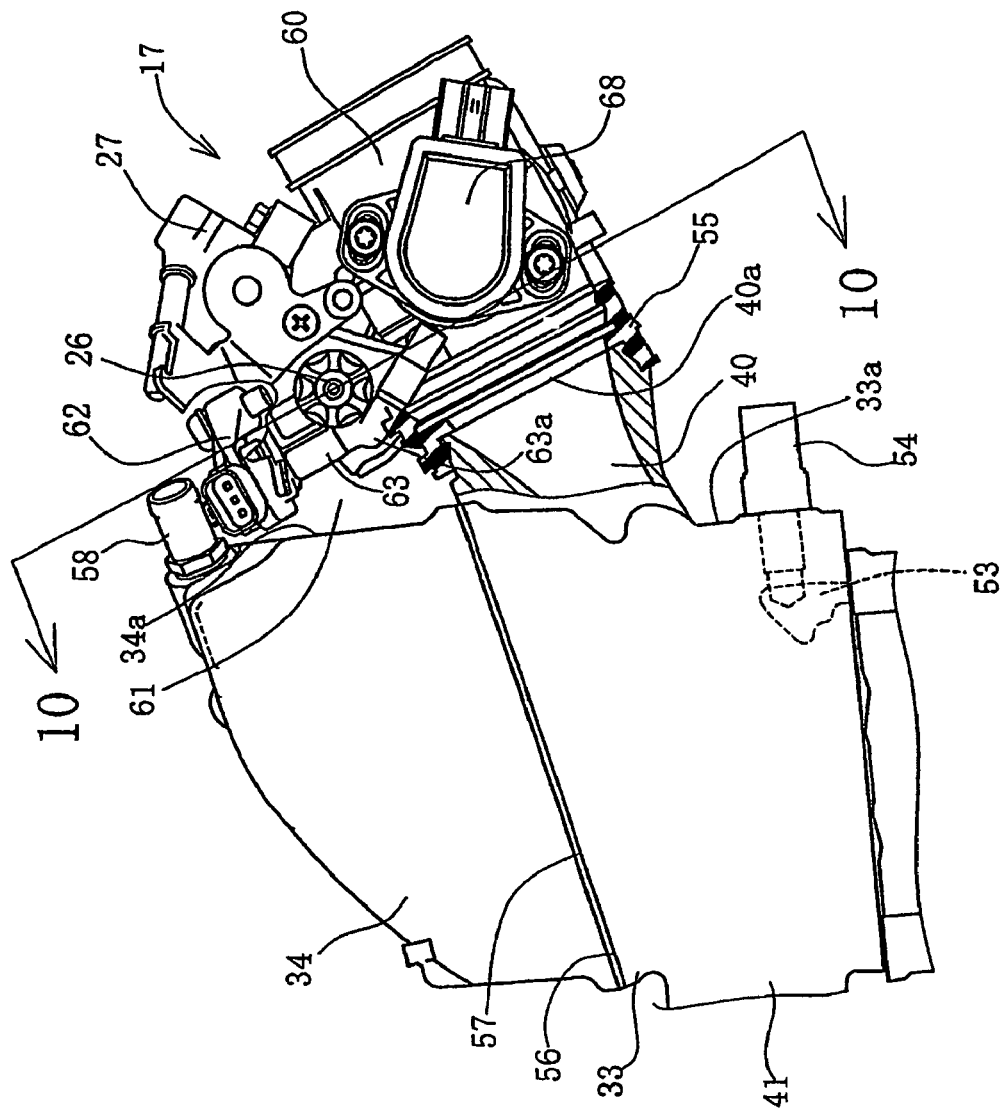
FIG. 7 is a side view of an upper portion of the engine on which a throttle body is mounted.

FIG. 7 is an appearance side view of the upper portion of the engine in a state in which the throttle body 17 is connected to the air-intake port 40. The throttle body 17 includes an intake air path 60 passing in a fore-and-aft direction therethrough. The intake air path 60 is arranged so as to be inclined towards the front, whereby the entire throttle body 17 is arranged so as to be inclined toward the front as a whole. A front portion of the intake air path 60 is connected to a rear end 40a of the air-intake port 40 via the insulator 55.

Since the joint surface 56 of the cylinder head 33 with respect to the cylinder block 32 is declined obliquely toward the front, a rear space 61 is defined between the rear wall 34a of the cylinder head cover 34 and the upper portion of the air-intake port 40. The idle-adjusting lever 26 and an intake pressure sensor 62 are disposed in the rear space 61 formed between the rear wall 34a of the cylinder head cover 34 and the upper portion of the air-intake port 40.

The intake pressure sensor 62 measures the intake-air pressure of an intake-air induction pipe 63 connected to the side surface of the intake air path 60. The intake pressure sensor 62 is disposed in proximity of the breather pipe 58 such that the intake pressure sensor 62 does not interfere with an interior of the rear space 61 located therebelow.

The intake-air induction pipe 63 extends so as to be declined obliquely downwardly from the intake pressure sensor 62. The intake-air induction pipe 63 is bent forwardly so as to extend (run out) at an intermediate portion 63a passing in front of the idle-adjusting lever 26, so that piping thereof into the rear space 61 is achieved while avoiding the interference thereof with the idle-adjusting lever 26. The idle-adjusting lever 26 and the injector 27 are positioned above a rear extension of the joint surface 56.

In this manner, by arranging the idle-adjusting lever 26 at a position substantially surrounded by the rear wall 34a of the cylinder head cover 34, the throttle body 17, and the injector 27, a compact (downsized) arrangement is achieved even though the idle-adjusting lever 26 is provided integrally with the fuel injection apparatus having a large number of components. A water temperature sensor 54 is inserted into the second water jacket 53 from the rear wall 33a of the cylinder head 33.

FIG. 8 show a view of the intake air path 60 taken along a cross-section in the fore-and-aft direction in a side view of FIG. 7. A throttle valve 64 is arranged in interior of the midsection of the intake air path 60 in the fore-and-aft direction so as to be capable of adjusting the opening of the intake air path. A fuel injection port 65 is formed on the upper wall of the intake air path 60 on the downstream side thereof so as to open into the intake air path 60. The fuel injection port 65 is an exit of a fuel injection path 66 of fuel injected from an injection port 27a of the injector 27. The fuel injection path 66 intersects the intake air path 60 at a relatively steep angle from obliquely upward direction.

The fuel injection path 66 communicates with the injector 27 on an upper side thereof. The fuel is injected from the injector 27 via the fuel injection path 66 towards to the fuel injection port 65. The fuel is injected into the intake air path 60 from the fuel injection port 65, and is supplied together with air in the intake air path 60 into the air-intake port 40 as air-fuel mixture. The injector 27 is mounted on a socket 67 which is formed integrally with the throttle body 17, and which communicates with the intake air path 60.

In this manner, when the injector 27 is provided at a relatively steep angle, the idle-adjusting lever 26 can be provided at a position close to the cylinder head. The inclined arrangement of the injector 27 is achieved by increasing the height of the rear wall 33a of the cylinder head 33 on the side of the air-intake port 40, such that the opening end of the air-intake port 40 can be formed further upwardly.

The idle-adjusting lever 26 is arranged at a position above the fuel injection port 65 so as to be overlapped with the fuel injection path 66 in the vertical direction. In this manner, when the idle-adjusting lever 26 is arranged so as to be overlapped with the fuel injection path 66, the idle-adjusting lever 26 can be arranged in the vicinity of the throttle valve 64 even though it is provided on the throttle body 17, so that the length of the intake air path 60 may be shortened correspondingly.

Figure 9:
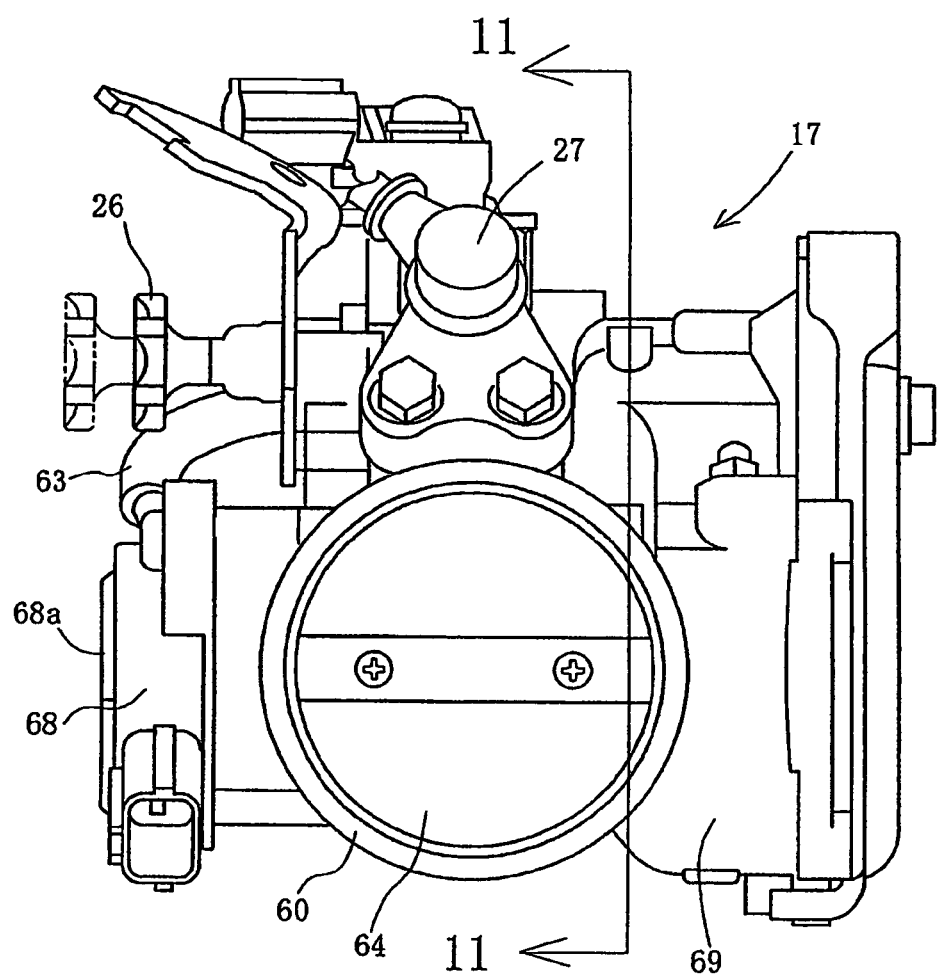
FIG. 9 is a view of the throttle body when viewed from the axially front side of an intake air path.

FIG. 9 is a view of the throttle body 17 when viewed from the axially front of the intake air path 60. A throttle sensor 68 configured to detect the throttle opening is arranged on the right side of the intake air path 60 with respect to the vehicle body. The lower end of the intake-air induction pipe 63 is located inwardly of an outer edge 68a of the throttle sensor 68. The idle-adjusting lever 26 is positioned inside the intake-air induction pipe 63.

During operation, the idle-adjusting lever 26 is pulled out rightward (as indicated by an imaginary lines showing the idle-adjusting lever 26) in the drawing at the time of adjustment at the time of start-up or the like, and at this time, is drawn out to slightly outwardly of the outer edge 68a of the throttle sensor 68. Therefore, an operating space for the idle-adjusting lever 26 is sufficiently secured, as described above. A main body portion 69 of the throttle body 17 is provided on the left side of the intake air path 60 with respect to the vehicle body.

Figure 10:
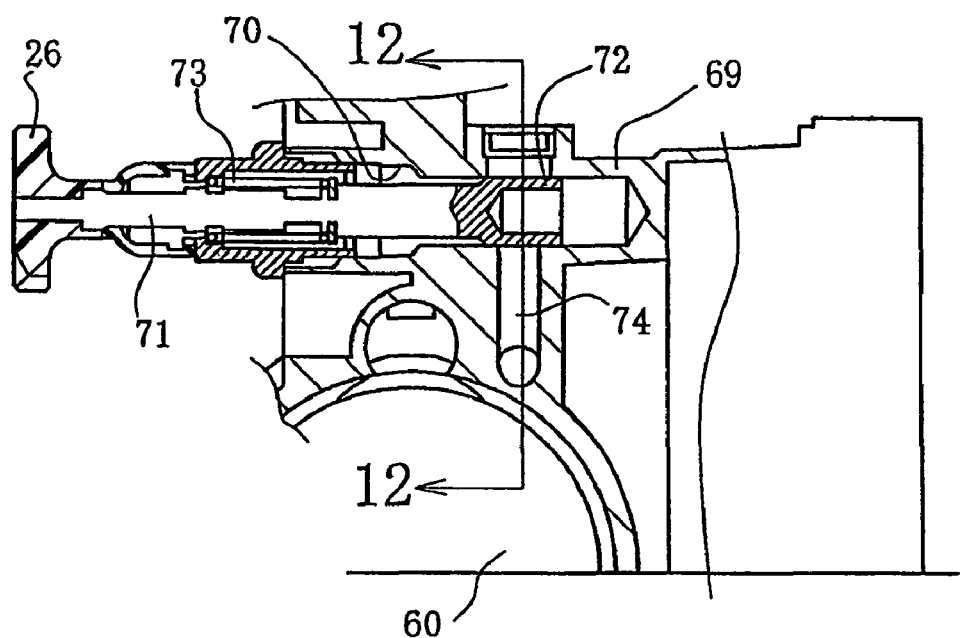
FIG. 10 is a cross-sectional view taken along the line 10-10 in FIG. 7.

FIG. 10 is a cross-sectional view taken along the line 10-10 in FIG. 7. The idle-adjusting lever 26 includes a plunger 71 to be inserted into a lateral hole 70 provided in the interior of the main body portion 69 so as to be capable of moving forward and backward, and the distal end thereof is provided with a valve portion 72 which is urged, by a spring 73, in a direction to close a bypass route 74. Moving the lever 26 in a direction to move the valve portion 72 outwardly, away from the bypass route 74, will allow more air to flow through the bypass route, and will increase the idle speed of the engine.

The valve portion 72 is operated to selectively move either forward or backward in the direction across the bypass route 74. When the valve portion 72 is moved forwardly by the spring 73 (inwardly, toward the right in the drawing), the valve portion 72 lies across the bypass route 74 to close the same. When the valve portion 72 is moved rearwardly (toward the left in the drawing against the force of the spring 73), the valve portion 72 moves out from the bypass route 74 so as to open the bypass route 74.

The bypass route 74 is an air path avoiding the throttle valve 64, and is operatively connected to an upstream path 75 and a downstream path 77 of the air intake path 60.

Figure 11:
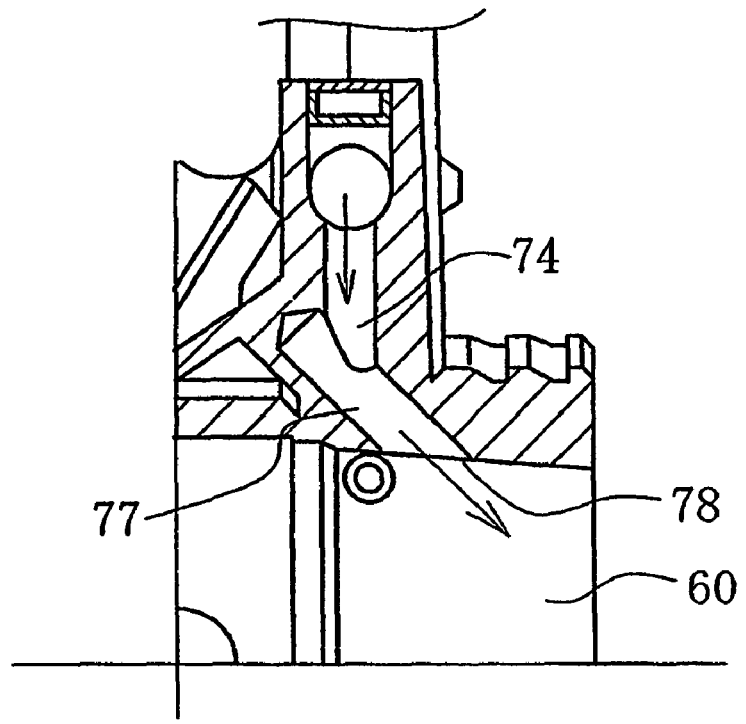
FIG. 11 is a cross-sectional view taken along the line 11-11 in FIG. 9.

FIG. 11 is a cross-sectional view taken along the line 11-11 in FIG. 9. The bypass route 74 is connected to the front end portion of the upstream path 75. The upstream path 75 extends obliquely downward toward the rear. An air intake port 76 opens at a position near the rear end portion of the intake air path 60 which is the upstream side of the throttle valve 64, and takes air constantly from the upstream of the throttle valve 64.

Figure 12:
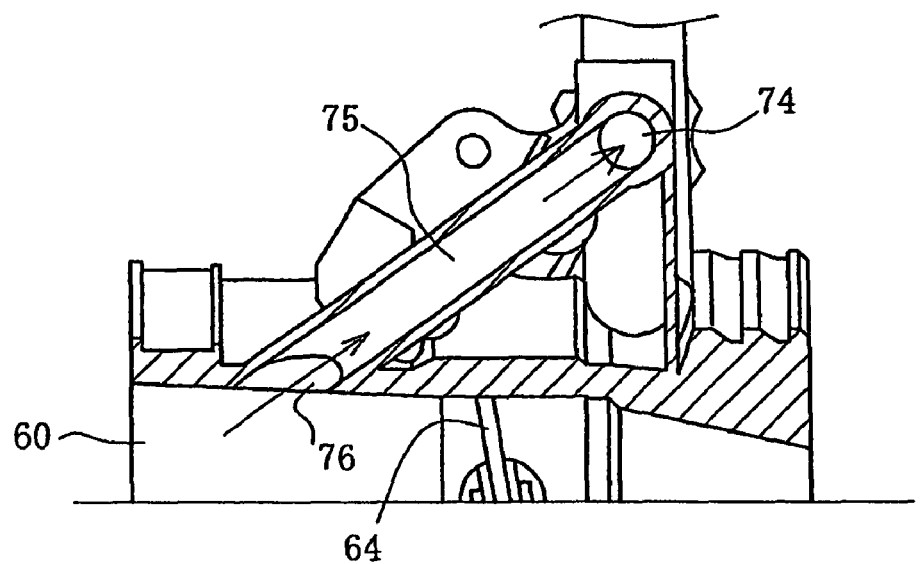
FIG. 12 is a cross-sectional view taken along the line 12-12 in FIG. 10.

FIG. 12 is a cross-sectional view taken along the line 12-12 in FIG. 10. The bypass route 74 is connected to the rear end portion (upper end portion) of the downstream path 77. The downstream path 77 extends obliquely downwardly toward the front. An air exit 78 opens at a position near the front end portion of the intake air path 60 which is the downstream side of the throttle valve 64.

Therefore, when the valve portion 72 moves forward and closes the bypass route 74, communication between the upstream path 75 and the downstream path 77 is disconnected (blocked). Hence, the normal state, in which the air is not allowed to flow from the upstream to the downstream of the throttle valve 64, is achieved.

In contrast, when the idle-adjusting lever 26 is pulled out to move the valve portion 72 rearward and open the bypass route 74, the upstream path 75 and the downstream path 77 are brought into communication with each other to allow air to flow from the upstream to the downstream of the throttle valve 64 via the bypass route 74, whereby the air-fuel ratio is varied by increasing the air component thereof.

Accordingly, the fuel at an air-fuel ratio suitable for start-up can be supplied and the idle state can be adjusted to facilitate the start-up. The configuration of the bypass route and the structure of the opening and closing valve of the idle-adjusting lever 26 are only examples, and other various configurations are also applicable.

An operation of the illustrative embodiment of the present invention is described below.

As shown in FIGS. 4, 5, 7 and 8, since the air-intake port 40 is opened upwardly, the throttle body 17 is arranged so as to be inclined downwardly as it extends toward the front, so that the idle-adjusting lever 26 can easily be arranged above the cylinder head 33. Arrangement of the idle-adjusting lever 26 near the rear wall 34a of the cylinder head cover 34 is also possible. Accordingly, since the idle-adjusting lever 26 can be arranged at a high position where a driver (an operator of the vehicle) is able to reach with his/her hand easily, operability of the idle-adjusting lever 26 is improved substantially.

Also, since the fuel injection apparatus hereof integrally includes the throttle body 17, the injector 27, and the idle-adjusting lever 26, and since the idle-adjusting lever 26 is arranged at the position substantially surrounded by the cylinder head cover 34, the throttle body 17, and the injector 27, the idle-adjusting lever 26 can be arranged at the rear space 61 behind the rear wall 34a of the cylinder head cover 34. Hence, by arranging the idle-adjusting lever in a compact space, the layout of the engine may be reduced in size, thereby proving a relatively compact engine.

In addition, by heightening (by increasing height of) the rear wall 33a of the cylinder head 33 on the side of the air-intake port 40, the opening end of the air-intake port 40 is formed so as to be oriented further upwardly. Therefore, since the injector 27 can be mounted with a larger inclination, the idle-adjusting lever 26 can be arranged at a position nearer to the cylinder head, so that the engine layout is reduced in size.

Also, as shown in FIG. 4, since the idle-adjusting lever 26 is arranged on the opposite side from the exhaust pipe 18 at a position to the side surface of the cylinder head cover 34, the operation is facilitated and the operability thereof is further improved. Furthermore, as shown in FIG. 8, since the idle-adjusting lever 26 is arranged at a position overlapped with the fuel injection path 66 in the vertical direction, downsizing of the fuel injection apparatus is achieved in the direction of the axial line of the intake air path 60.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle having a frame and an engine operatively attached to the frame, the engine comprising a cylinder head having an air-intake port formed therein, and a cylinder head cover, the improvement comprising a compact fuel injection apparatus comprising:
   a throttle body;
   an injector; and
   an idle-adjusting lever;
   wherein:
   the fuel injection apparatus is connected to an upwardly-facing opening end of the air-intake port in the cylinder head,
   the idle-adjusting lever is adapted to adjust a number of idle revolutions by being pulled out to increase an amount of intake air; and
   wherein when viewed in a side view, the idle-adjusting lever is situated above the cylinder head and is substantially surrounded by the cylinder head cover, the throttle body and the injector.

2. The idle-adjusting apparatus in a motorcycle according to claim 1, wherein when viewed in a side view, the idle-adjusting lever is arranged at a position vertically overlapped with a fuel injection path; said fuel injection path being adapted to provide communication of an injection port of the injector with an intake air path of the throttle body.

3. The idle-adjusting apparatus in a motorcycle according to claim 2, wherein when viewed in a side view, a connecting surface between the cylinder head cover and the cylinder head is declined towards a front direction of the motorcycle.

4. The idle-adjusting apparatus in a motorcycle according to claim 2, wherein the opening end of the air-intake port is opened so as to be inclined in a direction substantially opposite to an exhaust port protruding from the engine, and wherein the idle-adjusting lever is arranged on a first side of the motorcycle opposite to a second side of the motorcycle having an exhaust pipe.

5. The idle-adjusting apparatus in a motorcycle according to claim 1, wherein the opening end of the air-intake port is opened so as to be inclined in a direction substantially opposite to an exhaust port protruding from the engine, and wherein the idle-adjusting lever is arranged on a first side of the motorcycle opposite to a second side of the motorcycle having an exhaust pipe.

6. The idle-adjusting apparatus in a motorcycle according to claim 1, wherein when viewed in a side view, a connecting surface between the cylinder head cover and the cylinder head is declined towards a front of the motorcycle.

7. The idle-adjusting apparatus in a motorcycle according to claim 6, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

8. A motorcycle comprising:
an engine comprising:
  a cylinder head having an air-intake port formed therein;
  a cylinder head cover;
a fuel injection apparatus comprising
  a throttle body; and
  an injector; and
an idle-adjusting apparatus comprising an idle-adjusting lever;
wherein:
said fuel injection apparatus is connected to an upwardly-facing opening end of the air-intake port of the cylinder head,
during operation, the idle-adjusting lever is adapted to adjust a number of idle revolutions by adjusting an amount of intake air supplied to the engine; and
wherein when viewed in a side view, the idle-adjusting lever is arranged at a position located above the cylinder head such that said idle-adjusting lever is substantially surrounded by the cylinder head cover, the throttle body and the injector.

9. A motorcycle according to claim 8, wherein said engine comprises a fuel injection path formed therein, said fuel injection path being operatively connected with said air-intake port; and wherein when viewed in a side view, the idle-adjusting lever is arranged at a position vertically overlapped with said fuel injection path.

10. A motorcycle according to claim 9, wherein when viewed in a side view, a connecting surface between the cylinder head cover and the cylinder head is declined towards a front direction of the motorcycle.

11. A motorcycle according to claim 9, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

12. A motorcycle according to claim 8, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

13. A motorcycle according to claim 8, wherein when viewed in a side view, a connecting surface between the cylinder head cover and the cylinder head is declined towards a front of the motorcycle.

14. A motorcycle according to claim 13, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

15. A motorcycle comprising:
a body frame comprising a head pipe, a main frame extending rearwardly from said head pipe, a down frame extending downwardly from said head pipe, a lower frame extending rearwardly from said down frame, a pivot frame connecting said main frame and said lower frame; a reinforcing pipe connecting said main frame and said down frame;
an engine hanger extending from a connecting portion between said reinforcing pipe and said main frame;
an engine supported by said engine hanger; said engine having
  a cylinder head having an air-intake port formed therein;
  a cylinder head cover;
a fuel injection apparatus comprising
  a throttle body; and
  an injector; and
an idle-adjusting apparatus comprising an idle-adjusting lever;
wherein:
said fuel injection apparatus is connected to an upwardly-facing opening end of the air-intake port of the cylinder head,
during operation, the idle-adjusting lever is adapted to adjust a number of idle revolutions by adjusting an amount of intake air supplied to the engine;
when viewed in a side view, the idle-adjusting lever is arranged at a position located above the cylinder head such that said idle-adjusting lever is substantially surrounded by the cylinder head cover, the throttle body and the injector; and wherein
said idle-adjusting lever is disposed inwardly of said engine hanger such that a predetermined space is defined between an outward portion of said idle-adjusting lever and an inward portion of the engine hanger.

16. A motorcycle according to claim 15, wherein said engine further comprises a fuel injection path formed therein, said fuel injection path being operatively connected with said air-intake port; wherein when viewed in a side view, the idle-adjusting lever is arranged at a position vertically overlapped with said fuel injection path.

17. A motorcycle according to claim 16, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

18. A motorcycle according to claim 15, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

19. A motorcycle according to claim 15, wherein when viewed in a side view, a connecting surface between the cylinder head cover and the cylinder head is declined towards a front of the motorcycle; and wherein said idle-adjusting lever is disposed at a position located above an extension of an inclination plane of said connecting surface.

20. A motorcycle according to claim 19, wherein the opening end of the air-intake port is opened so as to be inclined in a direction opposite to an exhaust port protruding from the engine, and wherein the idle-adjusting lever is arranged on a first side of the motorcycle opposite to a second side of the motorcycle having an exhaust pipe.

* * * * *